United States Patent [19]
Wright

[11] 3,915,943
[45] Oct. 28, 1975

[54] TIRE TREAD HAVING LOW HEAT BUILDUP

[75] Inventor: Roy F. Wright, Bartlesville, Okla.

[73] Assignee: Phillips Petroleum Company, Bartlesville, Okla.

[22] Filed: Feb. 27, 1974

[21] Appl. No.: 446,425

[52] U.S. Cl. ...... 260/85.1; 260/79.5 B; 260/94.7 A; 260/782
[51] Int. Cl.² ................... C08D 5/02; C08C 5/00
[58] Field of Search ........ 260/94.7 A, 79.5 B, 85.1, 260/782; 450/37, 31

[56] References Cited
UNITED STATES PATENTS

| | | | |
|---|---|---|---|
| 2,524,424 | 10/1950 | Buret | 260/79.5 B X |
| 2,570,632 | 10/1951 | Barton | 260/782 X |
| 3,644,322 | 2/1972 | Farrar | 260/94.2 M |

OTHER PUBLICATIONS

Vulcanization & Vulcanizing Agents by W. Hoffmann; Palmenton Publishing Co., Inc., 1967; pp. 356–357.

*Primary Examiner*—William F. Hamrock

[57] ABSTRACT

Heat buildup in a tire-tread vulcanizate is reduced by admixing an aromatic monocarboxylic acid with the tread composition prior to vulcanization.

10 Claims, No Drawings

TIRE TREAD HAVING LOW HEAT BUILDUP

This invention relates to a method for reducing heat buildup in a vulcanized rubber composition.

The tread of a pneumatic tire used in high-speed and/or heavy duty applications is subjected to repeated flexing with resultant heat buildup due to such flexing. This phenomenon contributes, in large part, to premature failure of the tread stock.

In the past, heat buildup in a tire tread vulcanizate has been controlled by varying the relative amounts of curing components in the tread recipe, as for example, by providing a tighter cure. Such a technique has, however, resulted in the other desirable properties of the vulcanizate being adversely affected. Thus, there is desired in the art a tire tread vulcanizate which exhibits satisfactory properties while at the same time capable of being characterized by its having low heat buildup profile. In addition there is desired a method for providing a low heat buildup profile to a tire vulcanizate which avoids adversely affecting the other desirable properties thereof.

It is thus an object of this invention to provide a novel tire tread vulcanizate which is characterized by its exhibiting of a low heat buildup.

Another object of this invention is to provide a method for reducing heat buildup in a vulcanized rubber composition.

Other objects, aspects and advantages of this invention will be apparent to those skilled in the art from a reading of the disclosure and appended claims.

In accordance with the present invention, a novel vulcanizable composition is provided by the addition of an aromatic monocarboxylic acid to an otherwise vulcanizable composition prior to vulcanization thereof. Such a composition when vulcanized is characterized by its exhibiting a low heat buildup profile.

Thus in one present embodiment of the present invention, there is provided a novel vulcanizable tire tread composition. In another embodiment of this invention there is provided a method for reducing the heat buildup in a vulcanized tire tread. In a still further embodiment of this invention there is provided a novel vulcanized tire tread which is characterized by its exhibiting a low heat buildup profile while at the same time possessing such satisfactory physical properties as to render it useful for commercial applications.

The present invention is predicated upon the discovery that heat buildup in a vulcanized rubber composition can be reduced by incorporating into the tire tread formulation, prior to vulcanization, an aromatic monocarboxylic acid as hereinafter defined. While heat buildup of the vulcanizate is decreased, other properties such as modulus, crosslinking and reversion are not adversely affected.

The aromatic monocarboxylic acids useful in this invention are benzoic acid and substituted benzoic acids containing 1 to 5 ring substituents selected from the group consisting of alkyl, cycloalkyl, aryl and combinations thereof, and having from 7 to 17 carbon atoms per molecule. Examples of substituted benzoic acids include p-toluic acid, mesitylenic acid, m-phenylbenzoic acid, durylic acid, m-benzylbenzoic acid, p-(p-tert-butyl phenyl) benzoic acid and the like.

The amount of acid additive employed depends, inter alia, on factors such as the rubber stock, the vulcanizing agent, accelerator and the end use of the vulcanizate. The amount is generally in the range of from 0.1 to about 10 phr (parts by weight per 100 parts by weight of rubber), preferably from 1 to 3 phr.

The basic component of all rubber compounds is the elastomer, which may be in the form of rubber alone, or "masterbatches" of rubber and process oil, rubber and carbon black or rubber-oil-carbon black. The rubbers useful in the practice of his invention are natural and synthetic sulfur-vulcanizable rubbers and mixtures thereof. As used herein and in the claims, the term "sulfur-vulcanizable rubber" denotes a rubber having sufficient unsaturation, generally on the order of at least 0.5%, to be sulfur-vulcanizable. It is intended that the vulcanizing agent be limited to sulfur or sulfur-containing compounds thereby. Examples of suitable synthetic rubbers are styrene-butadiene copolymers, isobutylene-isoprene copolymers (butyl), ethylene-propylene-diene terpolymers (EPDM), butadiene-acrylonitrile copolymers (nitrile), polymers of chloroprene (neoprene) and polybutadiene. Such rubbers are well known in the art and can be prepared by any method known in the art. Particularly suitable are homopolymers and copolymers of conjugated dienes having from 4 to 12 carbon atoms and copolymers of conjugated dienes having 4 to 12 carbon atoms and monovinyl-substituted aromatic hydrocarbons having 8 to 20 carbon atoms containing at least 50 weight percent conjugated diene.

In a preferred embodiment, the rubber is a copolymer containing from 50 to 85 weight percent 1,3-butadiene and 50 to 15 weight percent styrene, prepared by a solution polymerization process in the presence of an organolithium initiator. In a more preferred embodiment, the rubber is a random copolymer containing from 50 to 85 weight percent 1,3-butadiene and 50 to 15 weight percent styrene, prepared by a solution polymerization process in the presence of a multifunctional organolithium initiator and in the presence of a randomizing agent. Multifunctional organolithium initiators can be prepared as disclosed in U.S. Pat. No. 3,644,322, which briefly comprises reacting an organomonolithium compound with a polymerizable additive, e.g. 1,3-butadiene, in the presence of a suitable solvent and thereafter reacting the product mixture with a polyvinyl aromatic compound. Typical of such multifunctional initiators is the reaction product of n-butyllithium, 1,3-butadiene and divinylbenzene. The randomizing agent can be any such agent known in the art, as for example, tetrahydrofuran. The term, "random copolymer" as used herein and in the claims, refers to a copolymer of a conjugated diene and a monovinylsubstituted aromatic hydrocarbon in which the amount of block monovinylsubstituted aromatic hydrocarbon, discernible by methods used in the art, ranges from none to a maximum of about 2 weight percent.

The vulcanizing agent is generally sulfur, or a sulfur-containing compound, which is intimately admixed with the rubber in approximate amounts ranging from 0.5 to 5 phr (parts per 100 parts of rubber).

The mixture to be vulcanized can also contain carbon black, extender oil, fillers, accelerators, antioxidants, antiozonants and the like. Such components and their proportions are well known in the art and will not be further discussed for the purpose of brevity.

The additives are incorporated into the uncured rubber stock using conventional rubber compounding techniques and equipment. Any suitable procedure or apparatus such as a roll mill or Banbury mixer which will intimately mix the rubber and additives can be used. Mixing is carried out at a temperature for a time sufficient to intimately mix the ingredients without promoting appreciable vulcanization. The order of mixing, temperature and times are well known in the art and will not be further discussed for the purpose of brevity.

Curing or vulcanization of the rubber composition is accomplished by heating the composition to an elevated temperature, generally in the range of 140° to 160°C. for a time in the range of several minutes to 1 hour or more. Determination of curing temperature and time is within the skill of one skilled in the art.

Vulcanizates having incorporated therein an aromatic monocarboxylic acid in accordance with this invention are useful as tire treads and as mechanical rubber goods in which heat buildup is desirably avoided.

The following examples illustrate this invention.

For all of the rubber stocks tested, the cure characteristics of the stocks were determined using a Monsanto Oscillating Disc Rheometer, Model LHS, at the temperatures indicated below, according to ASTM Method D-2705-68T. Vulcanizates were prepared by press curing the stocks at the temperatures and times indicated below. The physical properties of the vulcanizates were measured according to the following test procedures:

| | |
|---|---|
| $V \times 10^4$ | Moles of crosslinks per cubic centimeter of rubber. Determined from swelling measurements according to the method given in Rubber World, Vol. 135, pages 67–73 (1956). |
| 300% Modulus Tensile Elongation | ASTM D-412-66. Scott Tensile Machine CRE/2K. Tests were run at 80°F. |
| Heat Buildup ($\Delta T$, °F). | ASTM D-623-62 Method A. Goodrich Flexometer, 185 psi load, 0.175 inch stroke at 212°F. Test specimen is a right circular cylinder 0.7 inch diameter and 1 inch high. |

EXAMPLE I

Benzoic acid was added to a tire tread formulation based on an emulsion-polymerized random copolymer containing 76.5 percent 1,3-butadiene and 23.5 percent styrene extended with 37.5 phr of a process oil. The components given in Recipe A were mixed on a roll mill at 125°F. for 4 minutes. Rheometer data were determined at 307°F. Vulcanization was effected at 320°F. for 30 minutes. Results are given in Table I.

Recipe A

| | Parts by Weight |
|---|---|
| Rubber | 137.5 |
| Process oil | 2.5 |
| N220 carbon black | 70 |
| Zinc oxide | 3 |
| Stearic acid | 2 |
| Mixed diaryl-p-phenylenediamines | 1 |
| 6-ethoxy-1,2-dihydro-2,2,4-trimethyl quinoline | 2 |
| Wax[(1)] | 2 |

Recipe A-continued

| | Parts by Weight |
|---|---|
| Sulfur | 2.1 |
| N-oxydiethylene-2-benzotriazole sulfenamide | 1.2 |
| Tetramethyl thiuram monosulfide | 0.1 |
| Benzoic acid | 0–3 |

[(1)] A paraffinic wax having a melting point of 126–129°F.

Table I

| | Run Number | |
|---|---|---|
| | (Control) 6 | 7 |
| Benzoic acid | 0 | 3 |
| Scorch (4 in-lbs), min. | 6.2 | 5.3 |
| Cure rate, in-lbs/min. | 8 | 7 |
| 95% Cure, min. | 16 | 16 |
| Reversion | 40 | 42 |
| $V \times 10^4$ | 1.55 | 1.59 |
| 300% Modulus, psi | 1380 | 1490 |
| Tensile, psi | 3250 | 3250 |
| Elongation, % | 540 | 520 |
| Maximum Heat buildup, °F | 68 | 61 |

The above data illustrate the lower heat buildup in a tire-tread vulcanizate comprising an emulsion-polymerized copolymer of 1,3-butadiene and styrene having incorporated therein benzoic acid in accordance with this invention.

EXAMPLE II

Benzoic acid was added, in varying amounts, to a series of tire-tread compositions based upon a random copolymer containing 85 percent 1,3-butadiene and 15 percent styrene, extended with 38.2 phr (parts by weight per 100 parts by weight of rubber) of a process oil. The copolymer was a commercial product, prepared by a solution polymerization process in the presence of a multifunctional organolithium initiator and in the presence of tetrahydrofuran as randomizing agent. The components, as given in Recipe B, were mixed on a roll mill at 125°F. for 4 minutes. Rheometer data were determined at 307°F. Vulcanization was effected at 307°F. for 30 minutes. The results of these tests are given in Table II.

Recipe B

| | Parts by Weight |
|---|---|
| Rubber | 138.2 |
| Process oil | 1.8 |
| N220 carbon black | 70 |
| Zinc oxide | 3 |
| Stearic acid | 2 |
| Mixed diaryl-p-phenylenediamines | 1 |
| 6-ethoxy-1,2-dihydro-2,2,4-trimethylquinoline | 2 |
| Wax[(1)] | 2 |
| Sulfur | 2.1 |
| N-oxydiethylene-2-benzothiazole sulfenamide | 1.2 |
| Tetramethyl thiuram monosulfide | 0.2 |
| Benzoic acid | 0–3 |

[(1)] A paraffinic wax having a melting point of 126–129°F.

Table II

| | Run Number | | | | |
|---|---|---|---|---|---|
| | (Control) 1 | 2 | 3 | 4 | 5 |
| Benzoic acid | 0 | 1.5 | 2.0 | 2.5 | 3.0 |
| Scorch (4 in-lbs), min. | 9.1 | 7.8 | 7.7 | 7.3 | 7.2 |
| Cure rate, in-lbs/min. | 19.4 | 14.1 | 11.6 | 12.2 | 11.5 |
| 95% Cure, min. | 14.7 | 17.0 | 18.7 | 18.8 | 20.5 |

Table II-continued

| | Run Number | | | | |
|---|---|---|---|---|---|
| | (Control) 1 | 2 | 3 | 4 | 5 |
| Reversion (1 in-lb), min. | 32.5 | 46.2 | 60.0 | >60 | >60 |
| $V \times 10^4$, moles/cc | 1.89 | 2.00 | 1.93 | 2.01 | 2.02 |
| 300% Modulus, psi | 1260 | 1350 | 1350 | 1430 | 1440 |
| Tensile, psi | 2670 | 2480 | 2580 | 2430 | 2500 |
| Elongation, % | 510 | 470 | 480 | 450 | 460 |
| Maximum Heat buildup, °F. | 96 | 70 | 66 | 59 | 58 |

The above data illustrate the lower heat buildup in a tire-tread vulcanizate comprising a solution-polymerized random copolymer of 1,3-butadiene and styrene having incorporated therein benzoic acid in accordance with this invention. The compositions of runs 2-5 further exhibit improved crosslinking, modulus and reversion.

EXAMPLE III

A series of runs was carried out in which various additives were admixed with a tire tread composition based upon the solution-polymerized random copolymer of Example II. The components, as given in recipe C, were mixed on a roll mill at 125°F. for 4 minutes. Rheometer data were determined at the temperatures indicated below. Vulcanization was effected at 320°F. for 30 minutes, except as indicated below. Table III compares the effect of using additional stearic acid versus benzoic acid. Table IV compares lauric acid and benzoic acid and Table V compares salicyclic acid and phthalic anhydride with benzoic acid.

Recipe C

| | Parts by Weight |
|---|---|
| Rubber | 137.5 |
| Process oil | 2.5 |
| N220 carbon black | 70 |
| Zinc Oxide | 3 |
| Stearic acid | 2 |
| Mixed diaryl-p-phenylenediamines | 1[(2)] |
| 6-ethoxy-1,2-dihydro-2,2,4-trimethylquinoline | 2[(2)] |
| Wax[(1)] | 2 |
| Sulfur | 2.1 |
| N-oxydiethylene-2-benzothiazole sulfenamide | 1.0 |
| Tetramethyl thiuram monosulfide | 0.2 |
| Additive | 0–3 |

[(2)] Not present in runs 11–13.

Table III

Rheometer temperature 307°F.

| | Run Number | | |
|---|---|---|---|
| | (Control) 8 | 9 | 10 |
| Additional stearic acid | 0 | 3 | 0 |
| Benzoic acid | 0 | 0 | 3 |

Table III-continued

Rheometer temperature 307°F.

| | Run Number | | |
|---|---|---|---|
| | (Control) 8 | 9 | 10 |
| Scorch (4 in-lbs), min. | 5.6 | 5.5 | 4.4 |
| Cure rate, in-lbs/min. | 20 | 14 | 12 |
| 95% cure, min. | 10 | 11 | 14 |
| Reversion (1 in-lb.), min. | 20 | 24 | >60 |
| $V \times 10^4$, moles/cc | 1.78 | 1.83 | 1.96 |
| 300% modulus, psi | 1230 | 1300 | 1700 |
| Tensile, psi | 2880 | 2650 | 2880 |
| Elongation, % | 540 | 480 | 430 |
| Maximum Heat buildup, °F. | 98 | 77 | 60 |

The above data illustrate that the advantage of lower heat buildup gained by the use of benzoic acid is not afforded to the same degree by the use of additional stearic acid. Further, note the greatly increased reversion time of the composition of Run 10 as compared to those of Runs 8 and 9.

Table IV

Rheometer temperature 340°F.

| | Run Number | | |
|---|---|---|---|
| | (Control) 11 | 12 | 13 |
| Lauric acid | 0 | 2 | 0 |
| Benzoic acid | 0 | 0 | 2 |
| Scorch (4 in-lbs.), min. | 4.2 | 4.1 | 3.7 |
| Cure rate, in-lbs/min. | 24 | 21 | 21 |
| 95% cure, min. | 6.8 | 6.6 | 8.1 |
| Reversion (1 in-lb.), min. | 13 | 13 | 24 |
| 300% modulus, psi | 1190 | 1150 | 1500 |
| Tensile, psi* | 2830 | 2690 | 2740 |
| Elongation, %* | 560 | 570 | 450 |
| Maximum Heat buildup, °F. | 141 | 166 | 60 |

*60 minute cure.

The above data illustrate that lauric acid is not suitable for use according to the method of this invention. Lauric acid is seen to increase heat buildup in the vulcanizate without affecting other properties of the composition while benzoic acid not only reduces heat buildup significantly but also increases the time to reversion without significantly or adversely affecting other properties.

Table V

Rheometer temperature 320°F.

| | Run Number | | | |
|---|---|---|---|---|
| | (Control) 14 | 15 | 16 | 17 |
| Salicyclic acid | 0 | 1 | 0 | 0 |
| Phthalic anhydride | 0 | 0 | 1 | 0 |
| Benzoic acid | 0 | 0 | 0 | 1 |
| Scorch (4 in-lbs.), min. | 5.7 | 6.8 | 6.3 | 5.7 |
| Cure rate, in-lbs./min. | 18.7 | 10.8 | 8.0 | 5.7 |
| 95% cure, min. | 10 | 13 | 13 | 16 |
| $V \times 10^4$, moles/cc | 1.74 | 1.77 | 1.51 | 1.82 |
| 300% modulus, psi | — | — | — | — |

Table V-continued

| Rheometer temperature 320°F. | | Run Number | | |
|---|---|---|---|---|
| | (Control) 14 | 15 | 16 | 17 |
| Tensile, psi | 2880 | 2830 | 2550 | 2850 |
| Elongation, % | 550 | 540 | 570 | 510 |
| Maximum Heat buildup, °F. | 113 | 103 | 136 | 68 |

The above data illustrate that the phenolic substituted derivative of benzoic acid, i.e., salicyclic acid, and phthalic anhydride are ineffective in bringing about the lower heat buildup effected by the use of benzoic acid.

It will be evident to those skilled in the art that various modifications of this invention can be made, or followed, in the light of the foregoing disclosure and discussion, without departing from the spirit or scope thereof.

I claim:

1. A method for reducing heat buildup in a tire-tread vulcanizate comprising a sulfur-vulcanizable rubber which comprises admixing with the tire-tread stock prior to vulcanization an aromatic monocarboxylic acid having from 7 to 17 carbon atoms per molecule selected from the group consisting of benzoic acid and substituted benzoic acids having from 1 to 5 ring substituents selected from the group consisting of alkyl, cycloalkyl, aryl and combinations thereof, in an amount ranging from 0.1 to 10 parts of said acid per hundred parts of said rubber.

2. The method of claim 1 wherein said rubber is selected from the group consisting of homopolymers and copolymers of conjugated dienes having from 4 to 12 carbon atoms and copolymers of conjugated dienes having from 4 to 12 carbon atoms and monovinyl-substituted aromatic hydrocarbons having from 8 to 20 carbon atoms.

3. The method of claim 2 wherein said conjugated diene/monovinylsubstituted aromatic hydrocarbon copolymer contains at least 50 weight percent conjugated diene.

4. The method of claim 3 wherein said copolymer is formed from 1,3-butadiene and styrene.

5. The method of claim 4 wherein said copolymer is a random copolymer.

6. The method of claim 5 wherein said random copolymer is prepared by a solution polymerization process in the presence of a multifunctional organolithium initiator and in the presence of a randomizing agent.

7. The method of claim 6 wherein said aromatic monocarboxylic acid is benzoic acid.

8. The method of claim 1 wherein said aromatic monocarboxylic acid is present in an amount ranging from 1 to 3 parts by weight per 100 parts of said rubber.

9. A tire tread comprising a sulfur-vulcanizable rubber and from 0.1 to 10 parts per 100 parts of said rubber of an aromatic monocarboxylic acid having from 7 to 17 carbon atoms per molecule selected from the group consisting of benzoic acid and substituted benzoic acids having 1 to 5 ring substituents selected from the group consisting of alkyl, cycloalkyl, aryl and combinations thereof, said tire tread being characterized by low heat buildup.

10. A vulcanizable tire tread composition comprising a sulfur-vulcanizable rubber and from 0.1 to 10 parts per 100 parts of said rubber of an aromatic monocarboxylic acid having from 7 to 17 carbon atoms per molecule selected from the group consisting of benzoic acid and substituted benzoic acids having from 1 to 5 ring substituents selected from the group consisting of alkyl, cycloalkyl, aryl and combinations thereof, said composition being characterized by its exhibiting a low heat buildup profile when vulcanized.

* * * * *